United States Patent [19]
Okada

[11] Patent Number: 5,633,594
[45] Date of Patent: May 27, 1997

[54] DIFFERENTIAL TYPE CAPACITIVE SENSOR SYSTEM

[75] Inventor: Hiroyuki Okada, Tokyo, Japan

[73] Assignee: NEC Corporation, Tokyo, Japan

[21] Appl. No.: 563,486

[22] Filed: Nov. 28, 1995

[30] Foreign Application Priority Data

Nov. 28, 1994 [JP] Japan ............... 6-292859

[51] Int. Cl.$^6$ .................................. G01R 27/26
[52] U.S. Cl. .................. 324/679; 324/684; 324/685; 324/678; 73/514.32; 73/724
[58] Field of Search ............... 324/658, 661, 324/662, 665, 669, 670, 672, 678, 679, 684, 685, 686; 73/514.32, 718, 724, 780, 861.42; 361/280

[56] References Cited

U.S. PATENT DOCUMENTS

| | | | |
|---|---|---|---|
| 4,636,714 | 1/1987 | Allen | 324/678 |
| 4,743,836 | 5/1988 | Grzybowski et al. | 324/678 |
| 4,814,714 | 3/1989 | Beadle | 327/339 |
| 4,831,325 | 5/1989 | Watson, Jr. | 324/679 X |
| 5,095,750 | 3/1992 | Suzuki et al. | 73/514.32 |
| 5,321,989 | 6/1994 | Zimmer et al. | 73/724 |
| 5,431,057 | 7/1995 | Zimmer et al. | 73/724 |
| 5,451,940 | 9/1995 | Schneider et al. | 73/724 X |

FOREIGN PATENT DOCUMENTS

3915563C1 10/1990 Germany.

OTHER PUBLICATIONS

W. Kuehnel et al.; "A Surface Micromachined Silicon Accelerometer with on-chip Detection Circuitry"; Sensors and Actuators—A Physical A45(1994), Oct. No. 1, Lausanne, CH, pp. 7–16.

F.V. Schnatz et al.; "Smart CMOS Capacitive Pressure Transducer with on-chip Calibration Capability"; Sensors and Actuators—A Physical A34(1992), Jul. No. 1, Lausanne, CH, pp. 77–83.

Primary Examiner—Kenneth A. Wieder
Assistant Examiner—Diep Do
Attorney, Agent, or Firm—Whitham, Curtis, Whitham & McGinn

[57] ABSTRACT

In a capacitive sensor system, first and second driving signals opposite in phase are applied to a sensor capacitor and a reference capacitor, respectively, which are both connected to a switched capacitor circuit. An output signal of the switched capacitor is sampled by two sample-and-hold circuits which are operated in different phases of the driving signals. A differential amplifier generates a sensor signal in response to the difference in potential between the outputs of the sample-and-hold circuits.

15 Claims, 8 Drawing Sheets

1

DIFFERENTIAL TYPE CAPACITIVE SENSOR SYSTEM

BACKGROUND OF THE INVENTION

1. Field of the Invention

The present invention relates to a capacitive sensor system for detecting a physical amount by a small change of capacitance.

2. Description of the Related Art

A capacitive sensor generates an electrical signal in proportion to capacitance change caused by pressure or acceleration.

A prior art system for such a capacitive sensor includes a sensor capacitor, a reference capacitor, and a switched capacitor circuit connected to the sensor capacitor and the reference capacitor (see: Y. E. Park et al., "AN MOS SWITCHED-CAPACITOR READOUT AMPLIFIER FOR CAPACITIVE PRESSURE SENSORS", IEEE Custom Circuit Conf. pp. 380–384, 1983). In this prior art system, when a first driving voltage is applied to the sensor capacitor while applying ground voltage to the reference capacitor, the switched capacitor circuit is inactive. Then, when a second driving voltage is applied to the reference voltage while applying ground voltage to the sensor capacitor, the switched capacitor circuit is active to thereby generate a sensor voltage in response to pressure or acceleration applied to the sensor capacitor. This will be explained later in detail.

In the above-described prior art system, however, when the switched capacitor circuit is transferred from an inactive state to an active state, a charge stored in a feedback control switch transistor of the switched capacitor circuit appears in the output thereof as an offset voltage. This offset voltage also depends upon ambient temperature, so that a temperature drift is also generated.

SUMMARY OF THE INVENTION

It is an object of the present invention to provide a capacitive sensor system excluding the affect of an offset voltage and a temperature drift.

According to the present invention, in a capacitive sensor system, first and second driving signals opposite in phase are applied to a sensor capacitor and a reference capacitor, respectively, which are both connected to a switched capacitor circuit. An output signal of the switched capacitor is sampled and held by two sample-and-hold circuits which are operated in different phases of the driving signals. A differential amplifier generates a sensor signal in response to the difference in potential between the outputs of the sample-and-hold circuits.

Thus, even when an offset voltage and a temperature drift are included in each of the outputs of the sample-and-hold circuits, such an offset voltage and such a temperature drift cancel each other in the output of the differential amplifier.

BRIEF DESCRIPTION OF THE DRAWINGS

The present invention will be more clearly understood from the description as set forth below, in comparison with the prior art, with reference to the accompanying drawings, wherein.

DESCRIPTION OF THE PREFERRED EMBODIMENTS

Before the description of the preferred embodiments, a prior art capacitive sensor system will be explained with reference to FIG. 1, and 2A through 2D.

Figure 1:
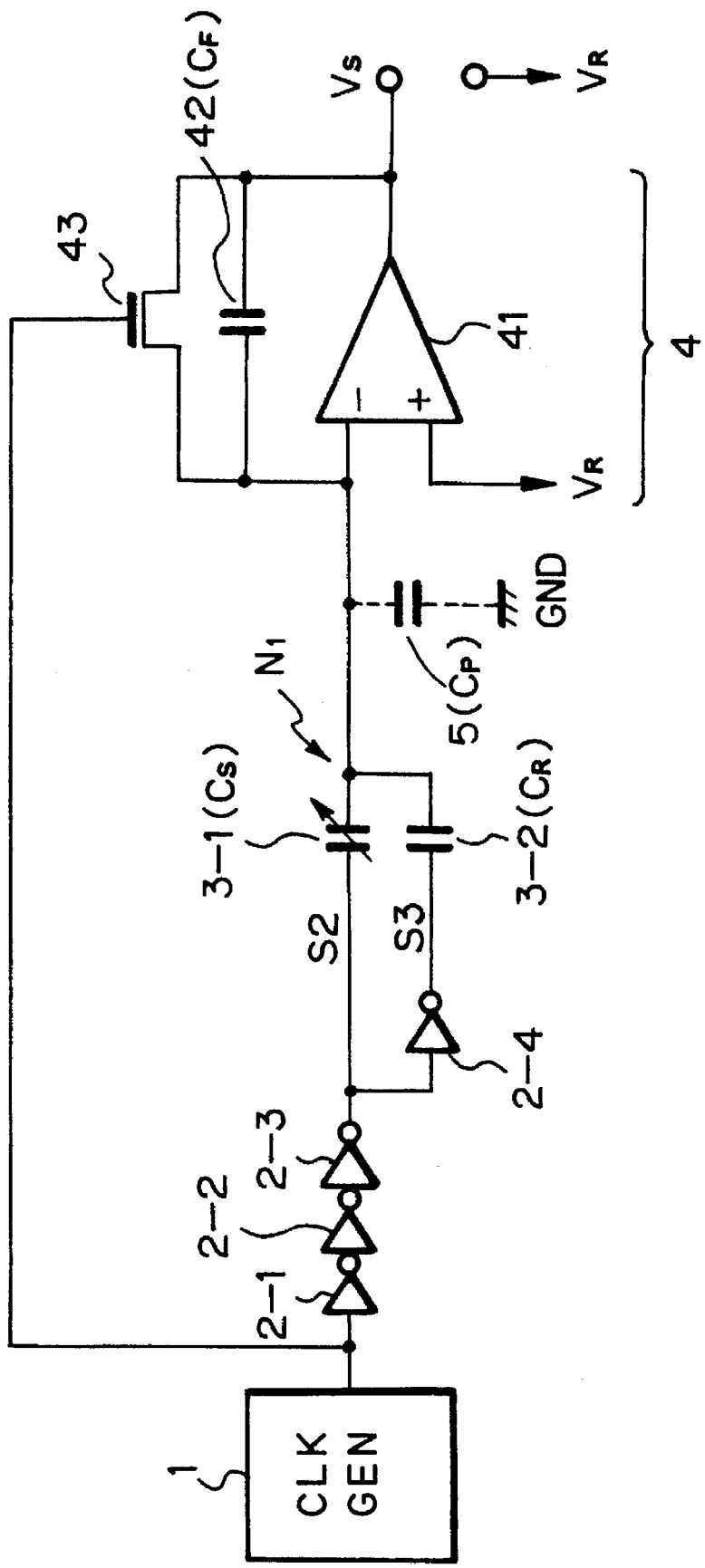
FIG. 1 is a circuit diagram illustrating a prior art capacitive sensor system.

In FIG. 1, reference numeral 1 designates a clock signal generating circuit whose output signal S1 is supplied via three inverters 2-1, 2-2 and 2-3 as a signal S2 to a sensor capacitor 3-1 and via the three inverters 2-1 to 2-3 and an inverter 2-4 as a signal S3 to a reference capacitor 3-2. A capacitance $C_S$ of the sensor capacitor 3-1 is changeable in response to pressure change or acceleration change, while a capacitance $C_R$ of the reference capacitor 3-2 is definite.

The sensor capacitor 3-1 and the reference capacitor 3-2 are connected to a switched capacitor circuit 4 formed by an operational amplifier or a feedback amplifier 41, a feedback capacitor 42 whose capacitance is $C_F$, and a feedback control switch (in this case, an N-channel MOS transistor) 43. In this case, an input terminal (−) of the feedback amplifier 41 has a parasitic capacitor 5 whose capacitance is $C_P$.

In the capacitive sensor system of FIG. 1, a sensor voltage $V_S$ is generated in response to a difference $(C_S-C_R)$ in capacitance.

The operation of the system of FIG. 1 is explained next with reference to FIGS. 2A through 2D.

Figures 2A, 2B, 2C, 2D:
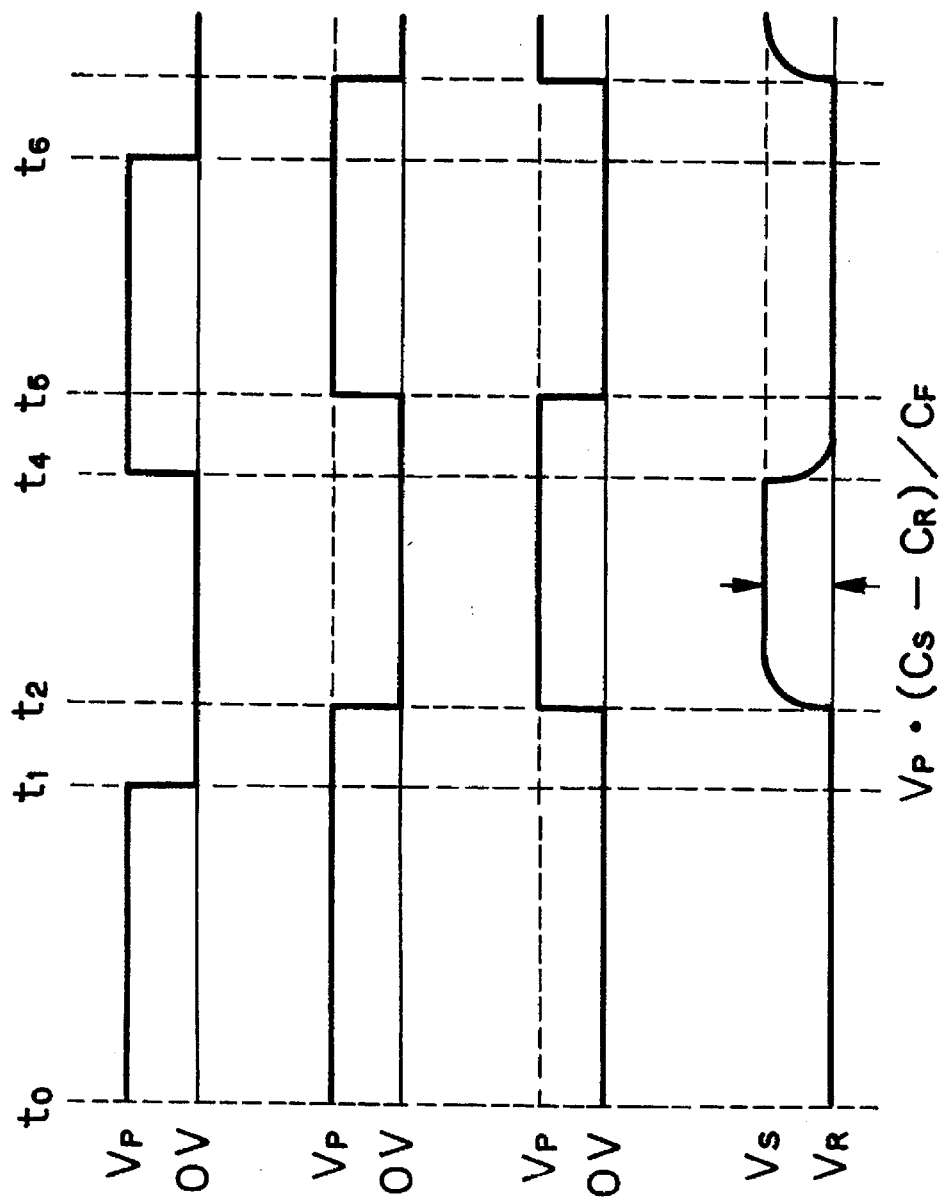
FIGS. 2A, 2B 2C and 2D are timing diagrams showing the operation of the system of FIG. 1.

At time $t_0$, as shown in FIG. 2A, the voltage of the signal S1 is high $(=V_P)$, so that the feedback control switch 43 is turned ON. Therefore, the switched capacitor circuit 4 is inactive. Also, as shown in FIG. 2B, the voltage of the signal S2 is $V_P$. Therefore, a charge $Q_S$ generated by the sensor capacitor 3-1 at a node $N_1$ is $$Q_S = -C_S \cdot (V_P - V_R) \qquad (1)$$

where $V_R$ is a reference voltage applied to an input terminal (+) of the feedback amplifier 41. Further, as shown in FIG. 2C, the voltage of the signal S3 is 0V. Therefore, a charge $Q_R$ generated by the reference capacitor 3-2 at the node $N_1$ is $$Q_R = C_R \cdot V_R \qquad (2)$$

Thus, from the formulae (1) and (2), a total charge $Q_t$ at the node $N_1$ is $$Q_t = C_R \cdot V_R - C_S \cdot (V_P - V_R) \qquad (3)$$

Further, since the feedback control switch 43 is turned ON, the sensor voltage $V_S$ remains at $V_R$ as shown in FIG. 2D.

Next, at time $t_1$, as shown in FIG. 2A, the voltage of the signal S1 is changed from $V_P$ to 0V, so that the feedback control switch 43 is turned OFF. Therefore, the switched capacitor 4 is active.

Next, at time $t_2$, as shown in FIG. 2B and 2C, the voltages of the signals 2S and S3 become OV and $V_P$, respectively. Therefore, a charge $Q_S'$ generated by the sensor capacitor 3-1 at a node $N_1$ is $$Q_S' = C_S \cdot V_R \quad (4)$$

Further, a charge $Q_R'$ generated by the reference capacitor 3-2 at the node $N_1$ is $$Q_R' = -C_R \cdot (V_P - V_R) \quad (5)$$

Thus, from the formulae (4) and (5), a total charge $Q_t'$ at the node $N_1$ is $$Q_t' = C_S \cdot V_R - C_R \cdot (V_P - V_R) \quad (6)$$

As a result, from the formulae (3) and (6), since the feedback control switch 43 is turned OFF, the following charge Q0 is stored in the feedback capacitor 42:

$$\begin{aligned} Q0 &= Q_t - Q_t' \\ &= -(C_S - C_R) \cdot V_P \end{aligned} \quad (7)$$

Therefore, as shown in FIG. 2D, the sensor voltage $V_S$ is represented by $$V_S = -Q0/C_F$$

$$= V_P \cdot (C_S - C_R)/C_F \quad (8)$$

Thereafter, the above-described operations at time $t_0$, $t_1$ and $t_2$ are repeated at time $t_4$, $t_5$ and $t_6$.

Thus, the sensor voltage $V_S$ of the capacitive sensor system of FIG. 1 is not affected by the parasitic capacitance $C_P$ which is dependent upon the ambient temperature, to thereby detect a small capacitance change.

In the capacitive sensor system of FIG. 1, however, every time the voltage of the signal S1 is changed from high ($=V_P$) to low (OV) indicated by times $t_1$ and $t_6$ in FIG. 2A, a charge $Q_d$ stored in the gate electrode of the feedback control switch 43 is emitted therefrom. As a result, the sensor voltage $V_S$ is actually represented by $$V_S = (V_P \cdot (C_S - C_R) + Q_d)/C_F \quad (9)$$

As is apparent from the formula (9), the charge $Q_d$ emitted from the gate electrode of the feedback control switch 43 appears in the sensor voltage $V_S$ as an offset voltage. This offset voltage is dependent upon the gate voltage $V_P$ and the soure-drain voltage. This offset voltage is particularly dependent upon the ambient temperature, and as a result, a temperature drift is generated in the sensor voltage $V_S$.

Further, an offset voltage and a temperature drift of the feedback amplifier 41 appears in the sensor voltage $V_S$.

Thus, it is difficult to completely remove the offset voltage and the temperature drift from the sensor voltage $V_S$.

Figure 3:
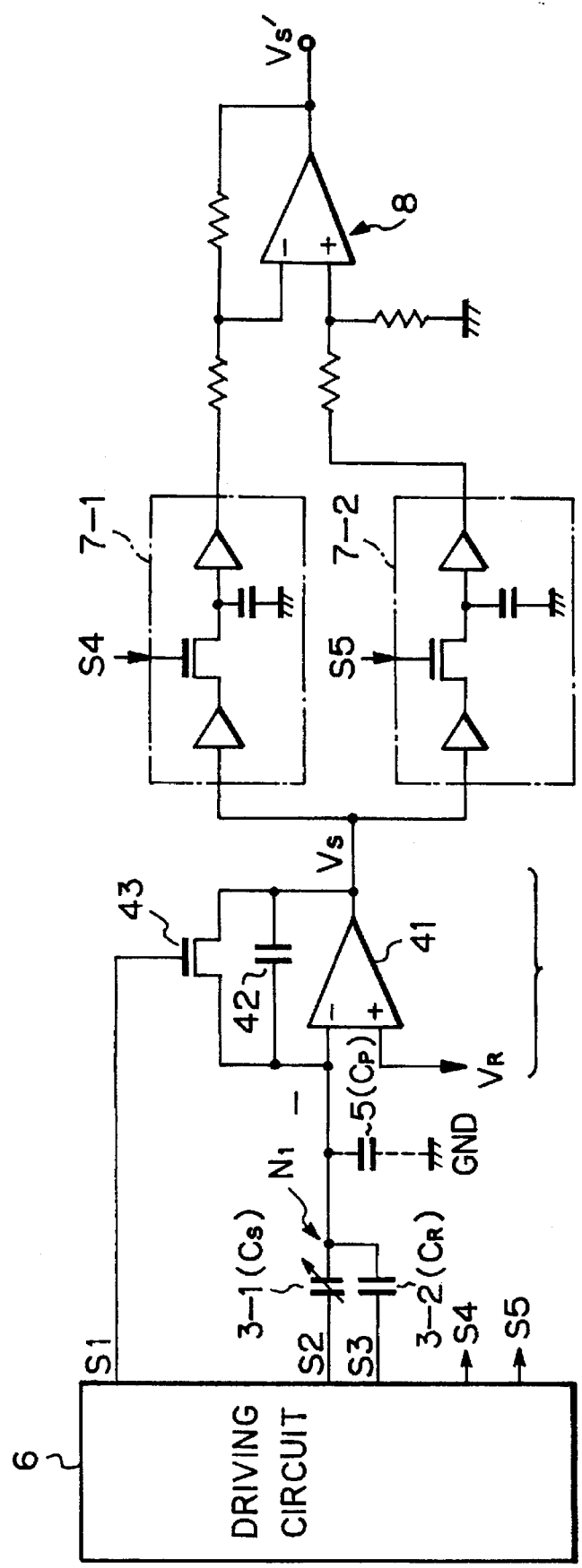
FIG. 3 is a circuit diagram illustrating a first embodiment of the capacitive sensor system according to the present invention.

In FIG. 3, which illustrates a first embodiment of the present invention, a driving circuit 6, two sample-and-hold circuits 7-1 and 7-2, and a differential amplifier 8 are added to the elements of FIG. 1. In this case, the driving circuit 6 serves as the clock signal generating circuit 1 and the inverters 2-1 through 2-4; and therefore, the driving circuit 6 generates the signals S1, S2 and 3. Also, the driving circuit 6 generates signals S4 and S5 to operate the sample-and-hold circuits 7-1 and 7-2 alternately.

The driving circuit 6 is explained next in detail with reference to FIG. 4.

Figure 4:
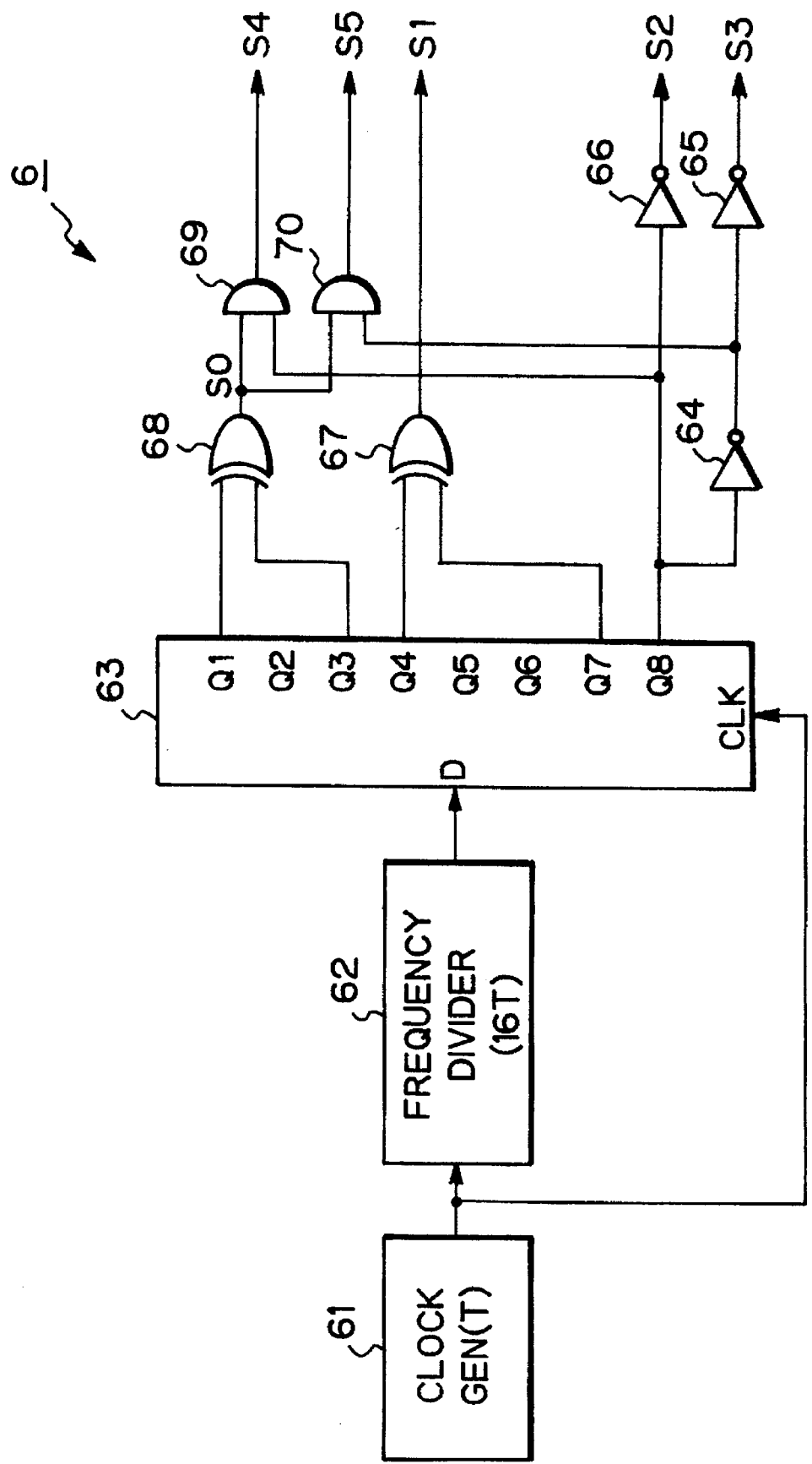
FIG. 4 is a circuit diagram of the driving circuit of FIG. 3.

In FIG. 4, reference numeral 61 designates a clock signal generating circuit for generating a clock signal whose time period is T, and 62 designates a frequency divider for dividing the clock signal of the clock signal generating circuit 61 to generate a divided signal whose time period is, for example, 16T. Also, reference numeral 63 designates a shift register for receiving the divided signal from the frequency divider 62 and generating shifted signals Q1, Q2, ..., Q8 as shown in FIGS. 5A through 5H clocked by the clock signal of the clock signal generating circuit 61.

Figure 5:
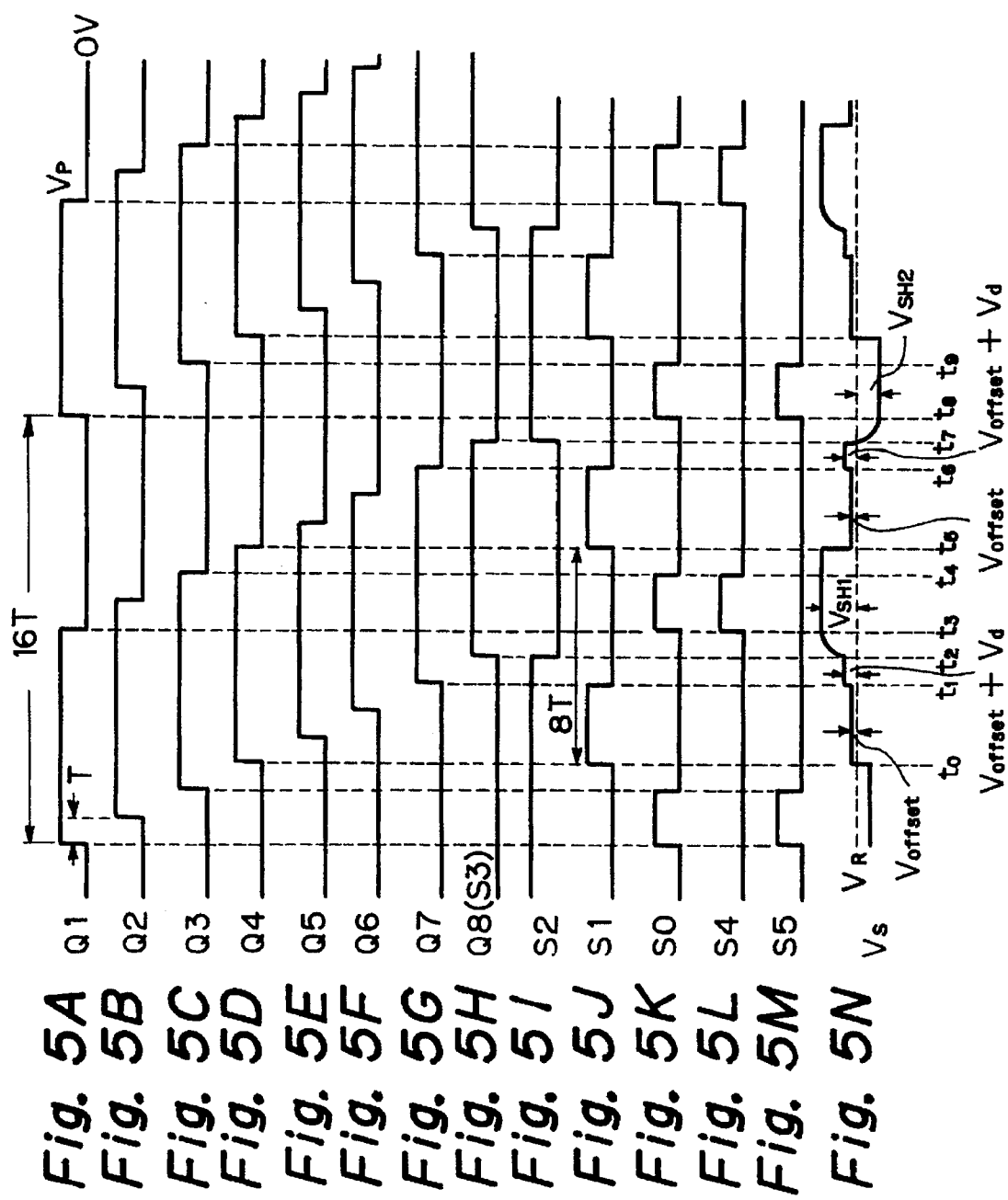
FIGS. 5A through 5N are timing diagrams showing the operation of the circuits of FIGS. 3 and 4.

The signal S3 is derived via inverters 64 and 65 from the signal Q8, and therefore, as shown in FIG. 5H, the signal S3 is approximately the same as the signal Q8.

The signal S2 is derived via an inverter 66 from the signal Q8, and therefore, as shown in FIG. 5I, the signal S2 is opposite in phase to the signal S3.

Also, an exclusive OR circuit 67 receives the signals Q4 and Q7, and as a result, the exclusive OR circuit 67 generates the signal S1 having a time period of 8T as shown in FIG. 5J.

Further, an exclusive OR circuit 68 receives the signals Q1 and Q3, and as a result, the exclusive OR circuit 68 generates a signal S0 having a time period of 8T as shown in FIG. 5K. The signal S0 is masked at an AND circuit 69 by the signal Q8, so that the signal S4 having a time period of 16T as shown in FIG. 5L is generated. Simultaneously, the signal S0 is masked at an AND circuit 70 by an inverted signal of the signal Q8, so that the signal S5 having a time period of 16T as shown in FIG. 5M is generated. That is, the signals S4 and S5 are opposite in phase to each other.

As shown in FIGS. 5H, 5I and 5J, the signal S1 is made high ($=V_P$) for a definite time period before the signal S3 (the signal S2) is changed from low ($=$OV) to high ($=V_P$) (from high to low), and as shown in FIGS. 5H, 5I and 5L, the signal S4 is made high ($=V_P$) for a definite time period after the signal S3 (the signal S2) is changed from low ($=$OV) to high ($=V_P$) (from high to low).

Similarly, as shown in FIGS. 5H, 5I and 5J, the signal S1 is made high ($=V_P$) for a definite time period before the signal S3 (the signal S2) is changed from high ($=V_P$) to low ($=$OV) (from low to high), and as shown in FIGS. 5H, 5I and 5M, the signal S5 is made high ($=V_P$) for a definite time period after the signal S3 (the signal S2) is changed from high ($=V_P$) to low ($=$OV) (from low to high).

The operation of the system of FIG. 3 is explained next with reference to FIGS. 5H through 5N.

At time $t_0$, as shown in FIG. 5J, the voltage of the signal S1 is high ($=V_P$), so that the feedback control switch 43 is turned ON. Therefore, the switched capacitor circuit 4 is inactive. In this case, the sensor voltage $V_S$ is represented by $$V_S = V_R + V_{offset} \quad (10)$$

where $V_{offset}$ is an offset voltage of the feedback amplifier 41.

Next, at time $t_1$, as shown in FIG. 5J, the voltage of the signal S1 is changed from high ($=V_P$) to low ($=$OV), the feedback control switch 43 is turned OFF. Therefore, the switched capacitor circuit 4 is active. At this time, the signals S2 and S3 are unchanged, and a charge $Q_d$ is emitted from the gate electrode of the feedback control switch 43. As a result, the sensor voltage $V_S$ is represented by $$V_S = V_R + V_{offset} + V_d \quad (11)$$

where $V_d$ is $Q_d/C_F$.

Next, at time $t_2$, as shown in FIGS. 5I and 5H, the voltages of the signals S2 and S3 become OV and $V_P$, respectively. Therefore, the charge Q0 represented by the formula (7) is stored in the feedback capacitor 42, and therefore, from the formulae (7) and (11), the sensor voltage $V_S$ is represented by $$V_S = V_P \cdot (C_S - C_R)/C_F + V_R + V_{offset} + V_d \quad (12)$$
$$= VSH1$$

Next, at time $t_3$, as shown in FIG. 5L, the signal S4 is changed from low to high, and as a result, the sample-and-hold circuit 7-1 samples and holds the voltage $V_S$ represented by the formula (12). Then, at time $t_4$, as shown in FIG. 5L, the signal S4 is changed from high to low, so that the operation of the sample-and-hold circuit 7-1 is stopped.

At time $t_5$, as shown in FIG. 5J, the voltage of the signal S1 is again high (=$V_P$), so that the feedback control switch 43 is turned ON. Therefore, the switched capacitor circuit 4 is inactive. In this case, the sensor voltage $V_S$ is represented by $$V_S = V_R + V_{offset} \quad (13)$$

Next, at time $t_6$, as shown in FIG. 5J, the voltage of the signal S1 is changed from high (=$V_P$) to low (=0V), so that the feedback control switch 43 is turned OFF. Therefore, the switched capacitor circuit 4 is active. At this time, the signals S2 and S3 are unchanged, and a charge $Q_d$ is emitted from the gate electrode of the feedback control switch 43. As a result, the sensor voltage $V_S$ is represented by $$V_S = V_R + V_{offset} + V_d \quad (14)$$

Next, at time $t_7$, as shown in FIGS. 5I and 5H, the voltages of the signals S2 and S3 become $V_P$ and 0V, respectively. Therefore, the following charge QO' is stored in the feedback capacitor 42:

$$QO' = -QO \quad (15)$$
$$= (C_S - C_R) \cdot V_P$$

Therefore, from the formulae (15) and (11), the sensor voltage $V_S$ is represented by $$V_S = -V_P \cdot (C_S - C_R)/C_F + V_R + V_{offset} + V_d \quad (16)$$
$$= VSH2$$

Next, at time $t_8$, as shown in FIG. 5M, the signal S5 is changed from low to high, and as a result, the sample-and-hold circuit 7-2 samples and holds the voltage $V_S$ represented by the formula (16). Then, at time $t_4$, as shown in FIG. 5L is changed from high to low, so that the operation of the sample-and hold circuit 7-1 is stopped.

On the other hand, in the differential amplifier 8, a difference between the sampled and hold voltages VSH1 and VSH2 of the sample-and-hold circuits 7-1 and 7-2 is calculated. That is, a sensor voltage $V_S'$ of the differential amplifier 8 is represented by $$V_S' = VSH1 - VSH2 \quad (17)$$
$$= 2V_P \cdot (C_S - C_R)/C_F$$

Thus, in the capacitive sensor system of FIG. 3, the sensor voltage Vs' is dependent upon only the voltage $V_P$ of the driving signals S1 and S2, the capacitance $C_S$ of the sensor capacitor 3-1, the capacitance $C_R$ of the reference capacitor 3-2 and the capacitance $C_F$ of the feedback capacitor 42, not upon the offset voltage $V_{offset}$ of the feedback amplifier 41 and the offset voltage $V_d$ of the charge of the feedback control switch 43.

Figure 6:
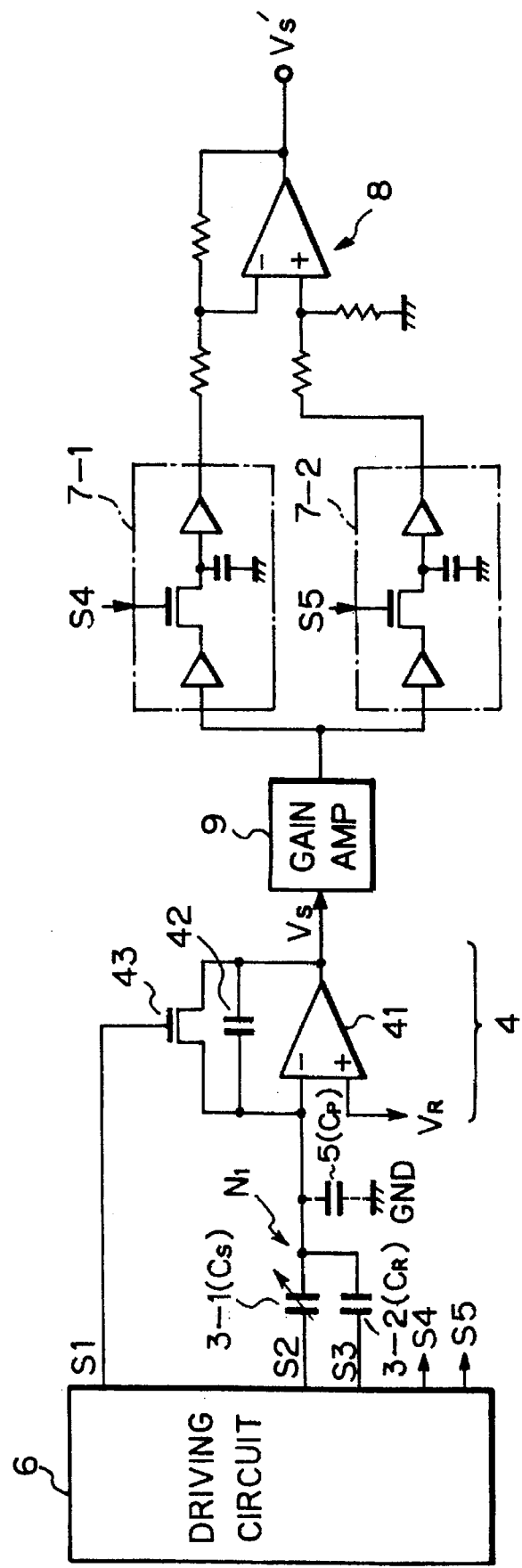
FIGS. 6, 7 and 8 are circuit diagrams illustrating second, third and fourth embodiments, respectively, of the capacitive sensor system according to the present invention.

In FIG. 6, which illustrates a second embodiment of the present invention, a gain amplifier 9 is interposed between the switched capacitor circuit 4 and the sample-and-hold circuits 7-1, and 7-2. The gain amplifier 9 amplifies the output voltage $V_S$ of the switched capacitor circuit 4 with respect to the reference voltage $V_R$. Even in the second embodiment, the offset voltage $V_{offset}$ of the feedback amplifier 41 and the offset voltage $V_d$ of the charge of the feedback control switch 43 can be removed.

Figure 7:
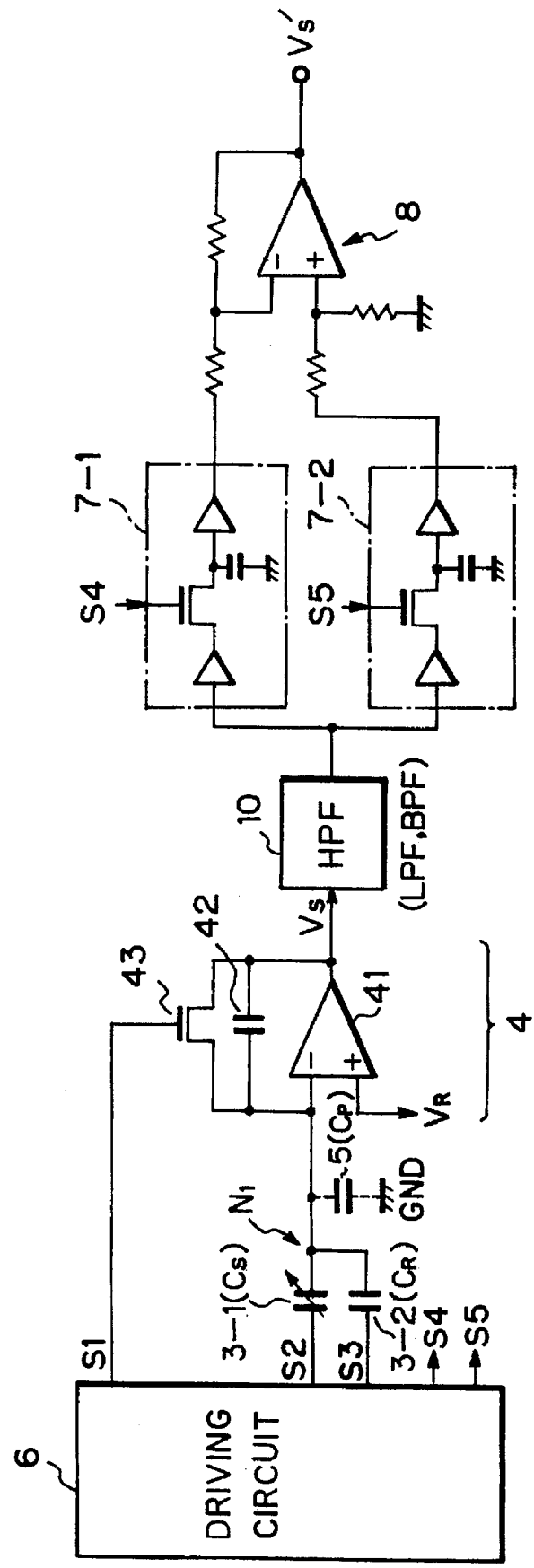

In FIG. 7, which illustrates a third embodiment of the present invention, a highpass circuit 10 is interposed between the switched capacitor circuit 4 and the sample-and-hold circuits 7-1, and 7-2. The highpass circuit 10 passes a high frequency component of the output voltage $V_S$ of the switched capacitor circuit 4 therethrough, to thereby remove a low frequency band noise therefrom. Even in the third embodiment, the offset voltage $V_{offset}$ of the feedback amplifier 41 and the offset voltage $V_d$ of the charge of the feedback control switch 43 can be removed.

Figure 8:
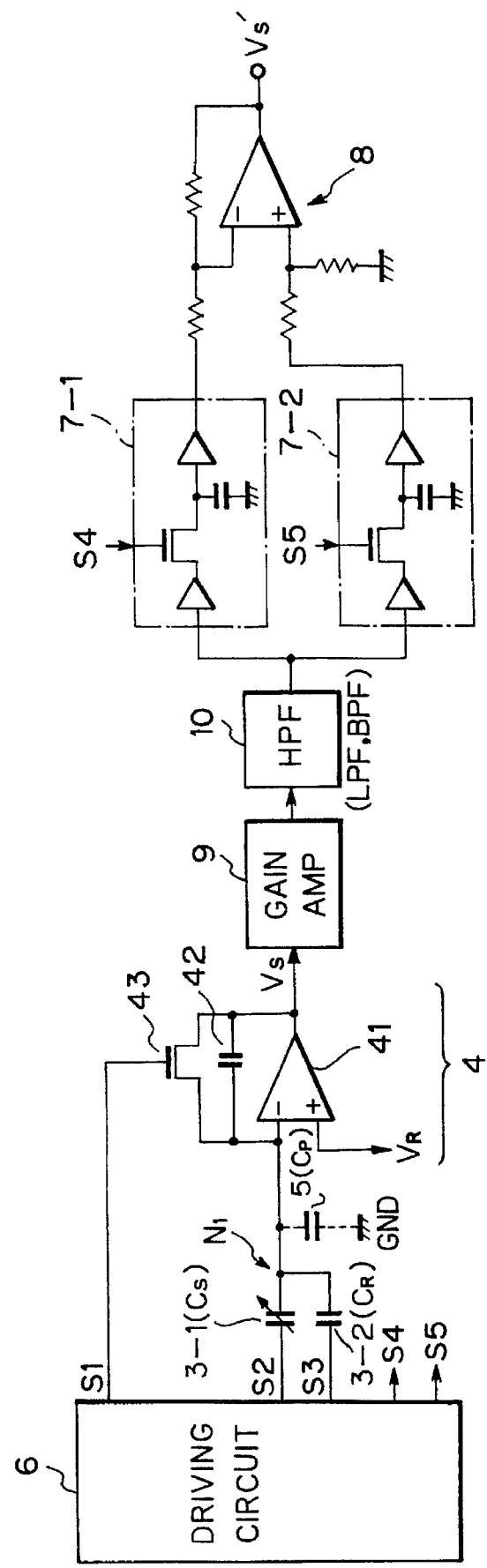

In FIG. 8, which illustrates a fourth embodiment, the second embodiment is combined with the third embodiment. Even in the fourth embodiment, the offset voltage $V_{offset}$ of the feedback amplifier 41 and the offset voltage $V_d$ of the charge of the feedback control switch 43 can be removed.

In the third and fourth embodiments, a lowpass circuit or a bandpass circuit can be used instead of the highpass circuit 10. In this case, the lowpass circuit removes a high frequency band noise, and the bandpass circuit removes a high frequency band noise and a low frequency band noise.

Also, in the above-described embodiments, both of the capacitances of the sensor capacitor and the reference capacitor can be changed in accordance with the change of pressure or acceleration.

As explained hereinbefore, according to the present invention, the offset voltage of the feedback amplifier and the offset voltage of the charge of the feedback control switch can be removed, and thus, a reliable capacitive sensor system can be obtained.

I claim:

1. A capacitive sensor system comprising:
   first means for generating a first driving signal;
   second means for generating a second driving signal opposite in phase to said first driving signal;
   a sensor capacitor, connected to said first means, for receiving said first driving signal;
   a reference capacitor, connected to said second means, for receiving said second driving signal;
   a switched capacitor circuit, connected to said sensor capacitor and said reference capacitor, for generating a signal corresponding to a difference in capacitance between said sensor capacitor and said reference capacitor;
   a first sample-and-hold circuit, connected to said switched capacitor circuit, for sampling and holding an output of said switched capacitor circuit when said first and second driving signals are high and low, respectively;
   a second sample-and-hold circuit, connected to said switched capacitor circuit, for sampling and holding the output of said switched capacitor circuit when said first and second driving signals are low and high, respectively; and
   a differential amplifier, connected to said first and second sample-and-hold circuits, for generating and output signal in response to a difference between outputs of said first and second sample-and-hold circuits.

2. A system as set forth in claim 1, wherein switched capacitor circuit comprises:
   a feedback amplifier having a first input connected to said sensor capacitor and said reference capacitor, a second input for receiving a reference voltage, and an output;

a feedback capacitor connected between the first input and the output of said feedback amplifier; and a feedback control switch connected between the first input and the output of said feedback amplifier, said feedback control switch being turned ON for a certain time period after an operation of one of said first and second sample-and-hold circuits is completed before a transition of said first and second driving signals.

3. A system as set forth in claim 1, further comprising a gain amplifier, connected between said switched capacitor circuit and said first and second sample-and-hold circuits, for amplifying an output of said switched capacitor circuit.

4. A system as set forth in claim 3, further comprising a circuit connected between said gain amplifier and said first second sample-and-hold circuits, for removing a frequency component of an output of said gain amplifier therefrom.

5. A system as set forth in claim 4, wherein said circuit comprises at least one of a highpass filter, a lowpass filter and a bandpass filter.

6. A system as set forth in claim 1, further comprising a circuit, connected between said switched capacitor circuit and said first and second sample-and-hold circuits, for removing a frequency component of an output of said switched capacitor circuit therefrom.

7. A system as set forth in claim 6, wherein said circuit comprises at least one of a highpass filter, a lowpass filter and a bandpass filter.

8. A capacitive sensor system comprising:

a sensor capacitor;

a reference capacitor;

a switched capacitor circuit, connected to said sensor capacitor and said reference capacitor, for generating a signal corresponding to a difference in capacitance between said sensor capacitor and said reference capacitor;

a first sample-and-hold circuit, connected to said switched capacitor circuit, for sampling and holding an output of said switched capacitor circuit;

a second sample-and-hold circuit, connected to said switched capacitor circuit, for sampling and holding the output of said switched capacitor circuit;

a differential amplifier, connected to said first and second sample-and-hold circuits, for generating and output signal in response to a difference between outputs of said first and second sample-and-hold circuits; and a driving circuit, connected to said sensor capacitor, said reference capacitor, said switched capacitor circuit and said first and second sample-and-hold circuits, for generating a first driving signal having a definite time period and applying said first driving signal to said sensor capacitor, generating a second driving signal opposite in phase to said first driving signal and applying said second driving signal to said reference capacitor, generating a reset signal for a definite time period in advance of a transition of said first and second driving signals and applying said reset signal to said switched capacitor circuit to thereby deactivate said switched capacitor circuit, generating a first sampling and holding signal for a definite time period after a rising transition of said first driving signal and before generation of said reset signal and applying said first sampling and holding signal to said first sample-and-hold circuit to thereby operate said first sample-and-hold circuit, and generating a second sampling and holding signal for a definite time period after a rising transition of said second driving signal and before generation of said reset signal and applying said second sampling and holding signal to said second sample-and-hold circuit to thereby operate said second sample-and-hold circuit.

9. A system as set forth in claim 8, wherein said driving circuit comprises:

a clock signal generator for generating a clock signal having a definite time period;

a frequency divider, connected to said clock signal generator, for generating a divided signal having a definite time period;

a shift register, connected to said clock signal generator and said frequency divider, for shifting said divided signal by said clock signal to generate a plurality of signals; and a logic circuit, connected to said shift register, for generating said first and second driving signals, said reset signal, and said first and second sampling and holding signals.

10. A system as set forth in claim 8, wherein said switched capacitor circuit comprises:

a feedback amplifier having a first input connected to said sensor capacitor and said reference capacitor, a second input for receiving a reference voltage, and an output;

a feedback capacitor connected between the first input and the output of said feedback amplifier; and a feedback control switch connected between the first input and the output of said feedback amplifier, said feedback control switch being turned ON by said reset signal.

11. A system as set forth in claim 8, further comprising a gain amplifier, connected between said switched capacitor circuit and said first and second sample-and-hold circuits, for amplifying an output of said switched capacitor circuit.

12. A system as set forth in claim 11, further comprising a circuit connected between said gain amplifier and said first and second sample-and-hold circuits, for removing a frequency component of an output of said gain amplifier therefrom.

13. A system as set forth in claim 12, wherein said circuit comprises at least one of a highpass filter, a lowpass filter and a bandpass filter.

14. A system as set forth in claim 8, further comprising a circuit, connected between said switched capacitor circuit and said first and second sample-and-hold circuits, for removing a frequency component of an output of said switched capacitor circuit therefrom.

15. A system as set forth in claim 14, wherein said circuit comprises at least one of a highpass filter a lowpass filter and a bandpass filter.

* * * * *